(12) United States Patent
Feder et al.

(10) Patent No.: US 6,360,527 B1
(45) Date of Patent: Mar. 26, 2002

(54) AXISYMMETRIC, CONVERGING-DIVERGING EXHAUST NOZZLE SWIVELED BY A GUIDED RING

(75) Inventors: Didier Georges Feder, Savigny Le Temple; Guy Jean-Louis Lapergue, Rubelles; Bertrand Pierre Renaud Monville, Moissy Cramayel; Laurent Claude Patrick Salperwyck, Lizines, all of (FR)

(73) Assignee: Snecma Moteurs (FR)

( * ) Notice: Subject to any disclaimer, the term of this patent is extended or adjusted under 35 U.S.C. 154(b) by 0 days.

(21) Appl. No.: 09/550,024

(22) Filed: Apr. 14, 2000

(30) Foreign Application Priority Data

Apr. 15, 1999 (FR) .............................. 99 04710

(51) Int. Cl.$^7$ .............................. F02K 1/00; F02K 1/12
(52) U.S. Cl. ................. 60/232; 239/265.35; 239/265.39
(58) Field of Search ....................... 60/232; 239/265.35, 239/265.37, 265.39, 265.41

(56) References Cited

U.S. PATENT DOCUMENTS

| 3,004,385 A | 10/1961 | Spears, Jr. et al. |
| 3,685,738 A | * 8/1972 | Leibach et al. ........ 239/265.39 |
| 4,508,270 A | 4/1985 | Joubert |
| 5,174,502 A | * 12/1992 | Lippmeier et al. ............ 60/232 |
| 5,239,815 A | * 8/1993 | Barcza ........................ 60/230 |
| 5,351,888 A | 10/1994 | Taylor et al. |

FOREIGN PATENT DOCUMENTS

| EP | 0 557 229 A1 | 8/1993 |
| FR | 1025827 | 4/1953 |
| FR | 2645593 | 10/1990 |
| WO | WO 92/03649 | 3/1992 |

* cited by examiner

*Primary Examiner*—Ted Kim
(74) *Attorney, Agent, or Firm*—Bacon & Thomas, PLLC

(57) ABSTRACT

An axisymmetric, converging-diverging exhaust nozzle swiveled by a guided vectoring ring (20). The guides comprise three axial apertures (44) which are each located in a base firmly joined to relatively fixed structure and of which the center planes intersect along the longitudinal axis of the turbojet-engine. The side walls (45) of the apertures (43) guide three mutually equidistant spherical rollers (41) fastened to radial stubs (40) firmly affixed to the vectoring ring (20).

5 Claims, 5 Drawing Sheets

AXISYMMETRIC, CONVERGING-DIVERGING EXHAUST NOZZLE SWIVELED BY A GUIDED RING

BACKGROUND OF THE INVENTION

1. Field of the Invention

The invention relates to a turbojet-engine exhaust nozzle.

2. Related Art

More specifically the invention relates to an axisymmetric, converging-diverging exhaust nozzle of which the diverging portion situated downstream of the converging portion can be swiveled relative to the turbojet-engine axis, said diverging portion comprising a plurality of diverging flaps hinging upstream on the downstream ends of the converging flaps and hinging downstream on linkrods connected to a vectoring ring of which the axial displacement and the tipping movement are controlled by a plurality of linear actuators anchored in a stationary structure, guide means being present to guide the vectoring ring relative to the stationary structure while it is moving.

Swiveling nozzles impart additional agility and improved manoeuverability in pitch and yaw to combat aircraft. In some designs, the unit and the converging-diverging nozzle are mounted in swiveling manner on a spherical element. In other designs, which offer weight reduction, only the diverging nozzle portion pivots by means of a vectoring ring.

The French patent document 2,645,593 A discloses a nozzle of which the vectoring ring, which is driven by three control actuators equidistant from one another by 120°, is mounted on the structure by three axial rods equidistant from each other by 120° which can slide in supports firmly affixed to relatively stationary structure. The rods are connected by swivels to the ring. If the guide length of the slide bearings is inadequate, the radial forces applied to the rod end generate a tipping torque that may jam the rod during its translation.

The patent document WO 92/03649 fits the vectoring ring with three radial stubs equidistant form each other by 120° about the axis and sliding in axial apertures between pairs of parallel rails which are solidly joined to the stationary structure and of which the center planes intersect along the turbojet-engine axis. Using this design, the center of the vectoring ring defined by the intersection of the stub axes is ideally situated on the turbojet-engine axis. However the pressure-generated radial torques in the link between the stubs may entail deleterious friction for the jet-deviation position. Said document reflects the nearest state of the art to the present invention.

SUMMARY OF THE INVENTION

One of the objects of the present invention is to reliably provide a guide means for a vectoring ring fitted with three rails that shall be jam-free while also assuring axial translation of the ring.

The invention solves this problem in that the guides of the vectoring ring comprise three axial apertures which are each situated in a base firmly joined to the stationary structure and of which the center planes intersect along the turbojet-engine axis, the side walls bounding said apertures acting as guides for three spherical rollers fastened to radial stubs firmly affixed to the vectoring ring and equidistant form each other.

Accordingly, the roller centers are situated in the center planes of the apertures and the axial resultant of the differential pressures due to jet deviation is tangentially applied to the contact joints of the spherical rollers and the side walls of the apertures, thereby eliminating undesired radial torques.

Advantageously the linear control actuators are connected by swivels to the vectoring ring and to the stationary structure. Therefore the absorption of the tangential component of the differential pressures does not affect at all the linear control actuators.

Preferably the radial stubs extend inside the vectoring ring.

To distribute the tangential forces over a larger rest area, each spherical roller preferably is mounted in a corresponding aperture with insertion of a first slide sliding axially along the side walls of said aperture and of a second slide sliding radially on the first slide, said roller being spherically linked to said second slide.

Advantageously the first slide is fitted with a radial orifice receiving in a sliding manner the second slide.

BRIEF DESCRIPTION OF THE DRAWINGS

Other advantages and features of the invention are elucidated in the following illustrative description and in relation to the attached drawings.

DETAILED DESCRIPTION OF PREFERRED EMBODIMENTS OF THE INVENTION

Figure 1:
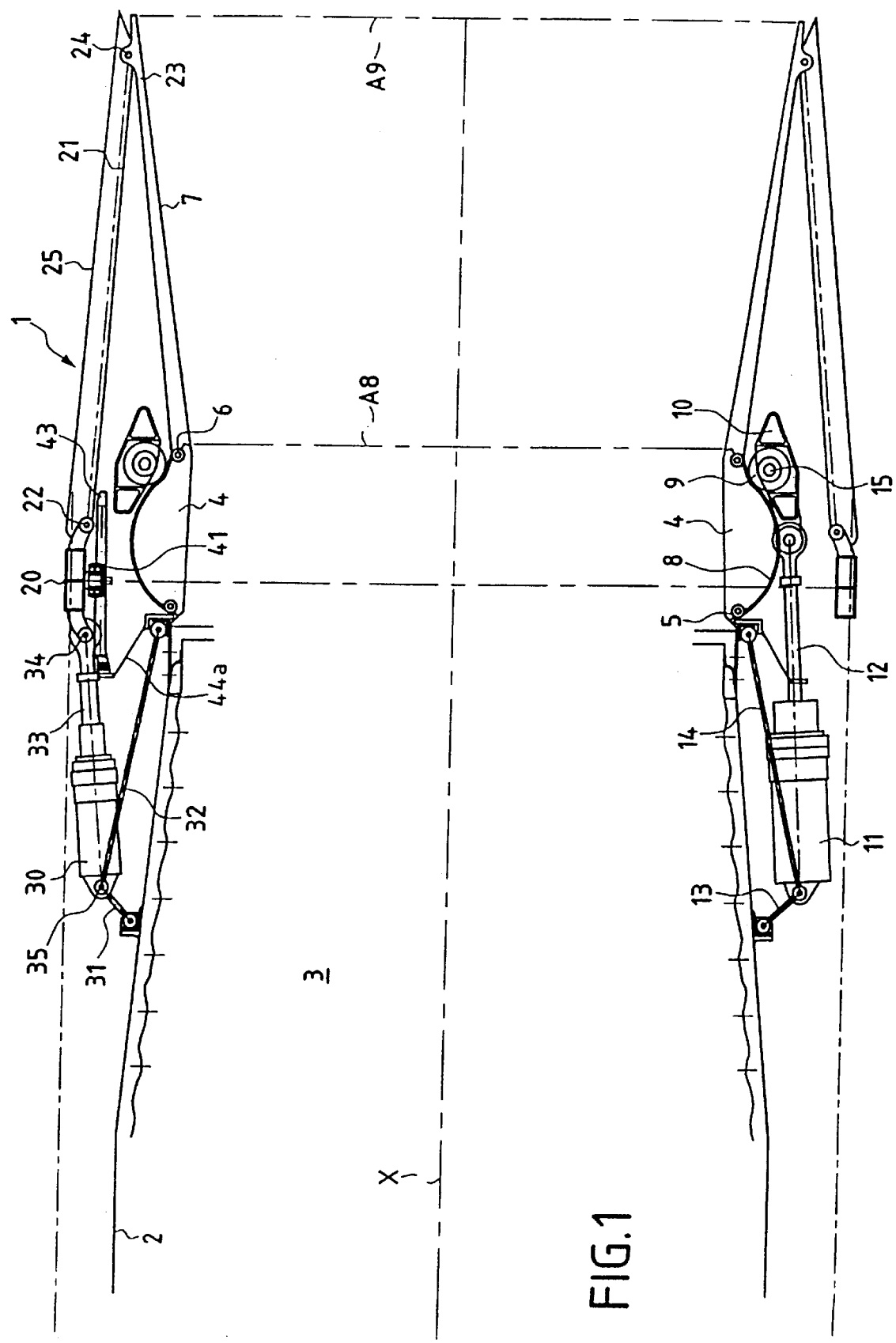
FIG. 1 is a section in an axial plane of a swiveling, axisymmetric, converging-diverging nozzle of the invention shown in the open configuration and with undeviated jet.
Figure 2:
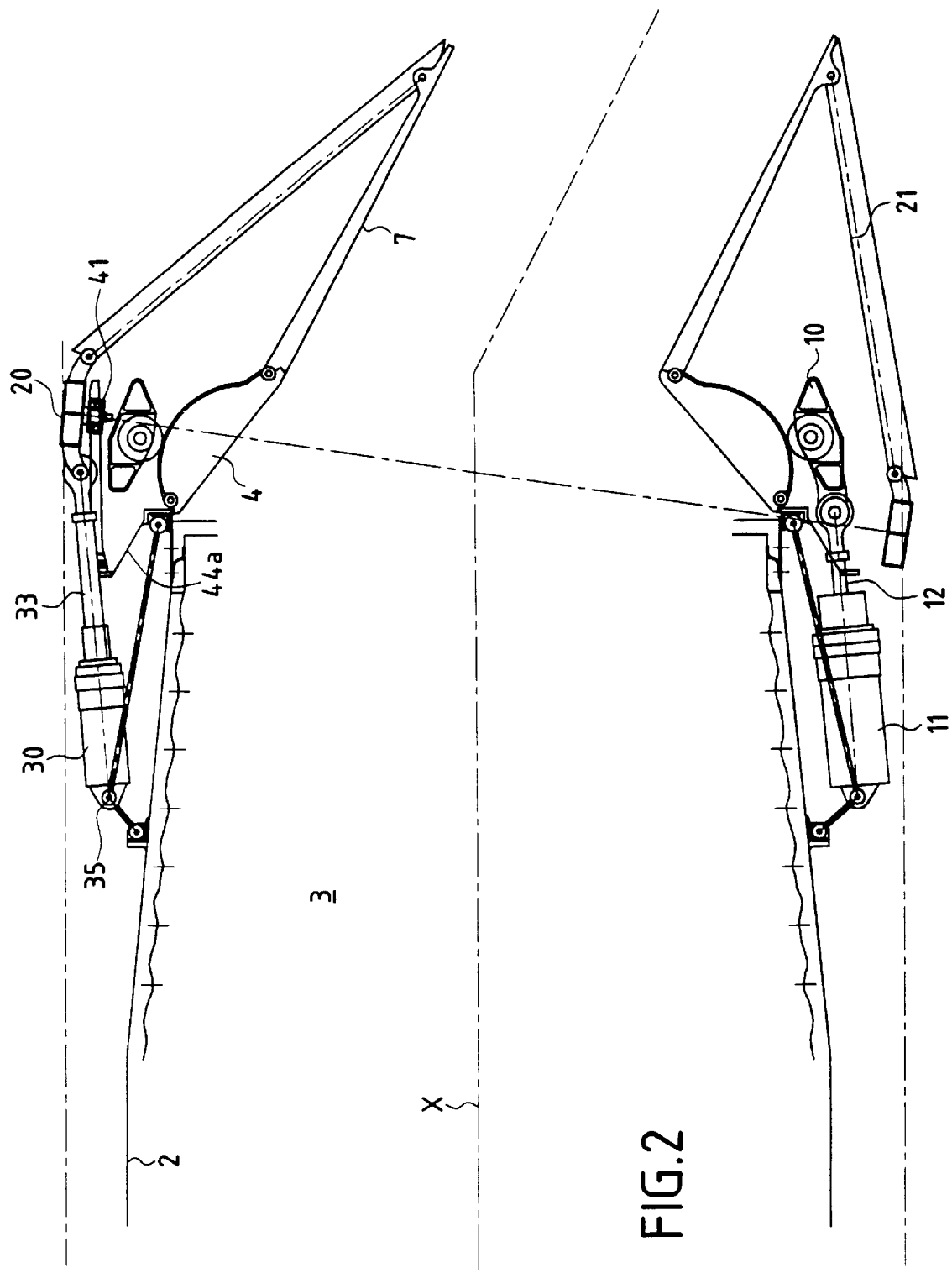
FIG. 2 is similar to FIG. 1 but shows the nozzle in a closed position and with the jet deviated downward.

FIGS. 1 and 2 show a swiveling, converging-diverging, axisymmetric nozzle situated downstream of an annular housing 2 having an axis X and bounding an afterburner chamber 3 situated downstream of a turbojet engine having an axis X.

The nozzle 1 comprises a first set of converging flaps 4 hinging on the downstream end of the housing 2 by means of hinges 5, the exhaust bounded by said flaps determining the cross-section A8 of the throat of the nozzle 1.

The upstream ends of the diverging flaps 7 hinge on universal joints 6 downstream of the converging flaps 4.

The converging flaps 4 comprise alternating driven converging flaps and follower converging flaps. Driven converging flaps 4 are fitted on their outer surface with cam surfaces 8 which rollers rollers 9 contact in rolling engagement, the rollers being borne on a drive ring 10 having an axis X and being displaced parallel to this axis X by a plurality of linear control actuators 11 anchored upstream in the housing 2, the rods 12 of said actuators moving jointly in order to regulate the cross-section A8 as a function of the flight stages of the aircraft equipped with the nozzle 1. Each linear control actuator 11 is connected by linkrods 13 ands 14 reacting thrust loads to the housing 2. The rods 12 of the linear actuators 11 are connected by swivels 15 to the drive ring 10.

The diverging flaps 7 comprise also a plurality of alternating driven diverging flaps and a plurality of follower diverging flaps. The driven diverging flaps each are hinged by universal joints 6 allowing radial and tangential hinging on the driven converging flaps.

The diverging flaps 7 are connected to a vectoring ring 20 by linkrods 21 hinged at their upstream ends on the vectoring ring 20 at 22 and hinged by links 24 at their downstream ends on the downstream ends 23 of the diverging flaps. The linkrods 21 may be integrated into external cold flaps 25 situated in the extension of the turbojet-engine's fairing.

The vectoring ring 20 is driven by at least three linear control actuators 30 equidistantly distributed around the axis X and connected by their upstream ends to the housing 2 by linkrods 31 and 32 absorbing the thrusts from the actuators 30. The rods 33 of the actuators 30 are connected by a swivel 34 to the vectoring ring 20. Preferably the connections 35 between the actuators 30 and the link rods 31 and 32 also are swivels.

The vectoring ring 20 is fitted on its inside surface with three radial stubs 40 equidistant from each other by 120°. Each stub 40 is fitted with a roller 41 having a spherical external wall.

Figure 3:
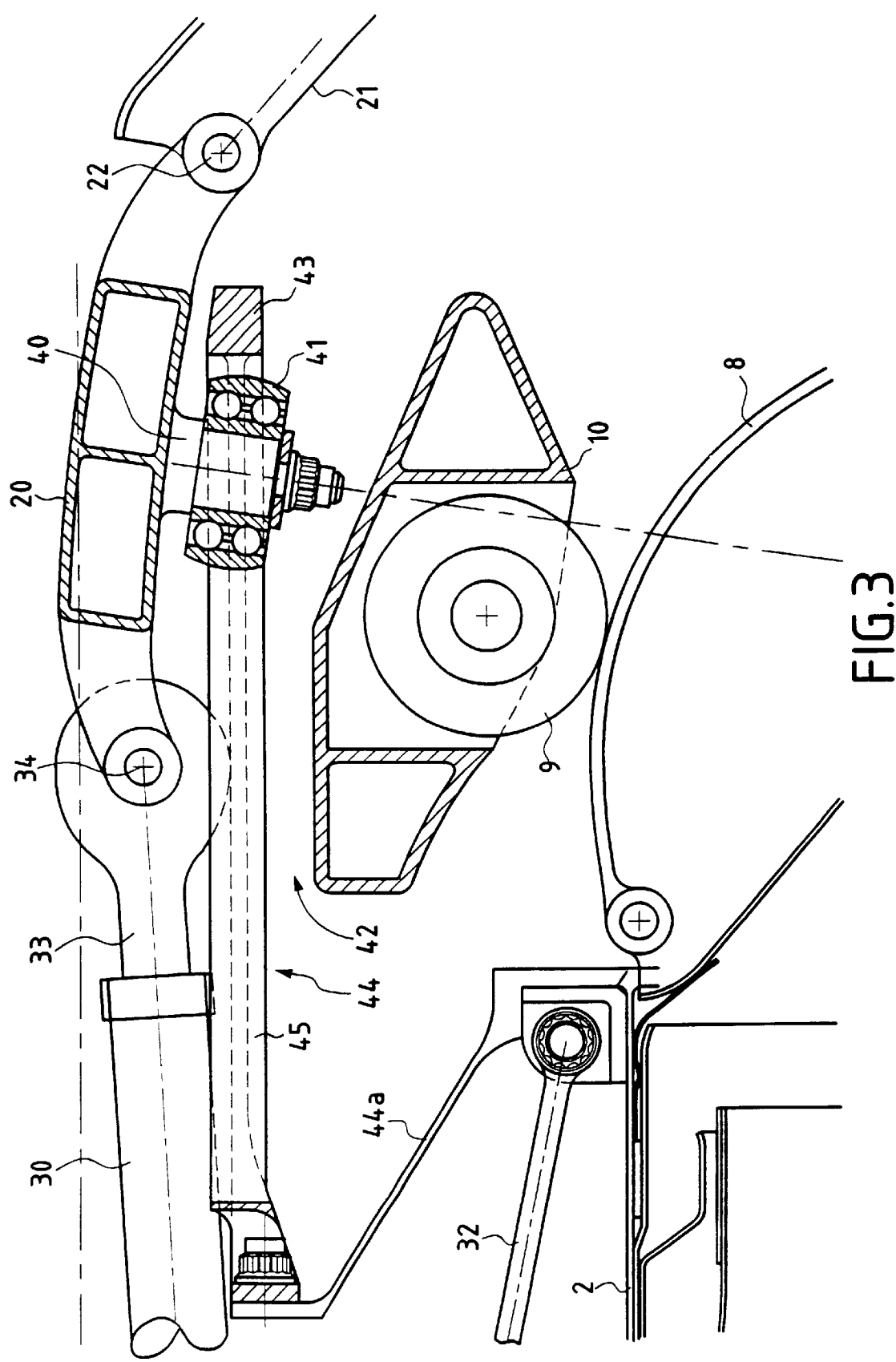
FIG. 3 is a detail view on an enlarged scale of the guides of the vectoring ring in accordance with a first embodiment of the invention.
Figure 4:
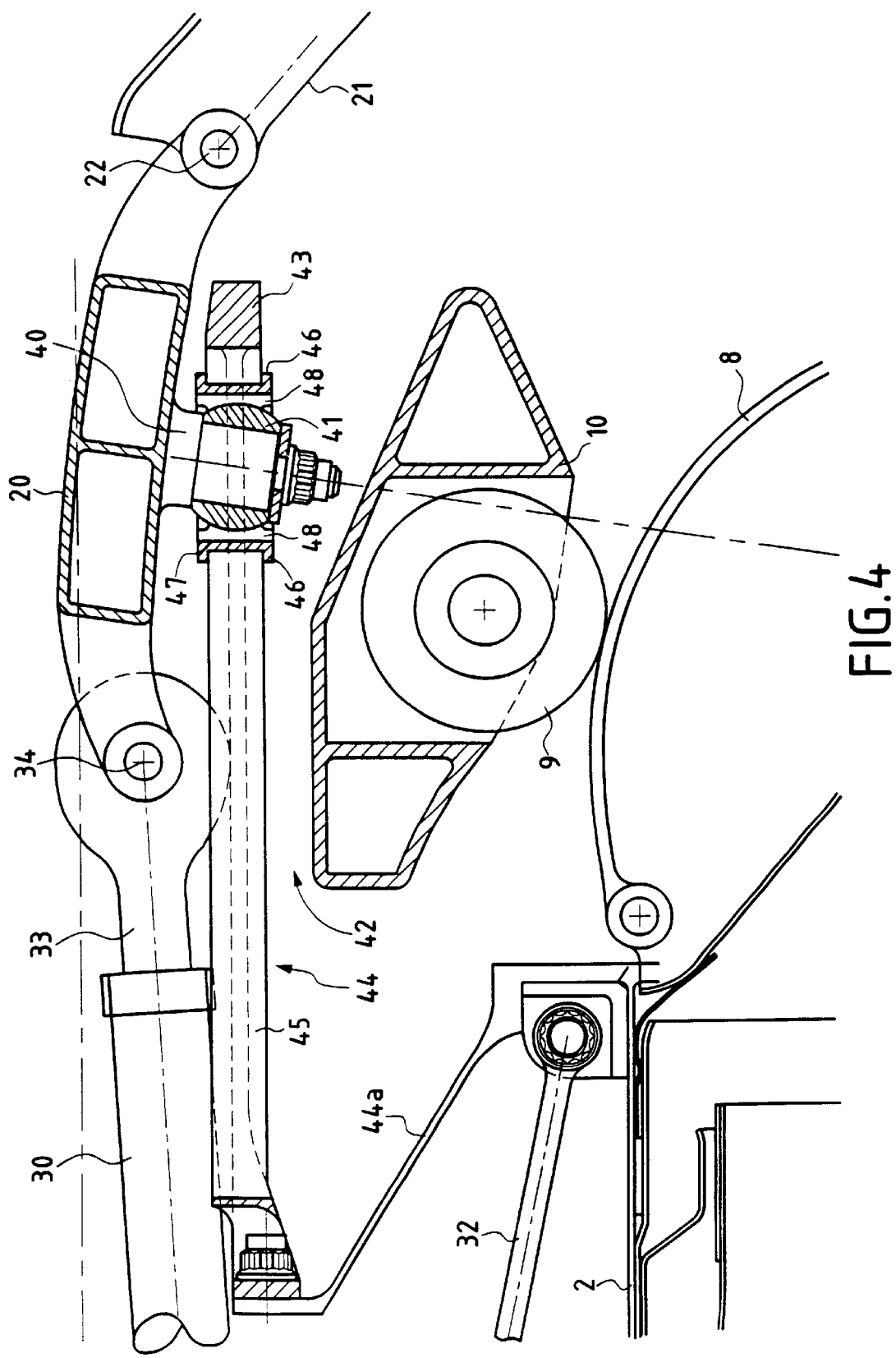
FIG. 4 is a detail view on an enlarged scale of the guides of the vectoring ring according to a second embodiment of the invention.

Each roller 41 cooperates with guides 42 firmly joined to the housing 2 as shown in FIGS. 3 and 4.

Figure 5:
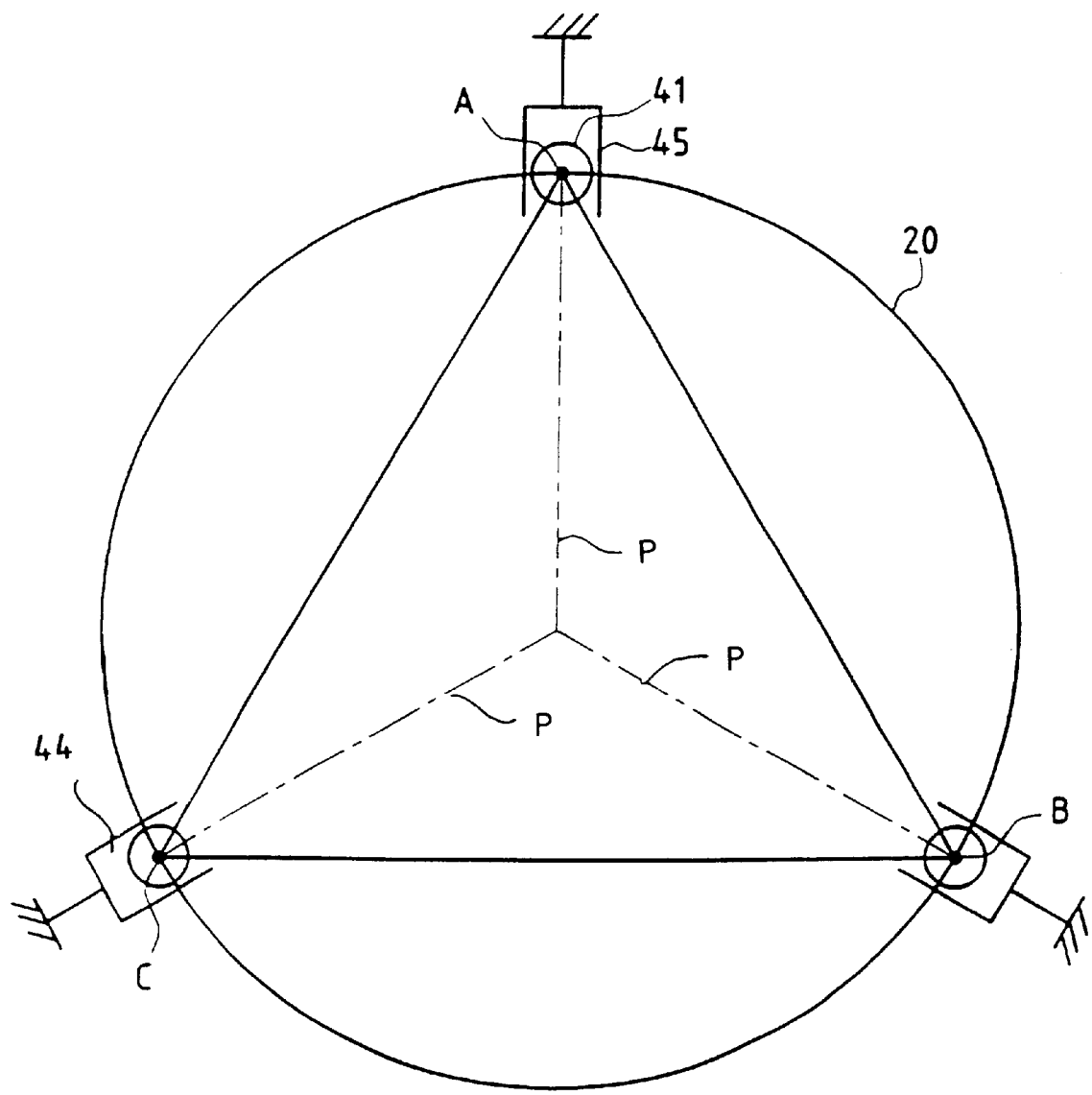
FIG. 5 is a schematic view of the vectoring ring and of the guides in a plane perpendicular to the axis of the vectoring ring.

For each roller 41, the guides 42 comprise a base 43 fixedly joined to an annular bracket 44a situated at the downstream end of the housing 2. The base 43 extends downwardly parallel to the axis X in the space subtended by the drive ring 10 and the vectoring ring 20. The base 43 comprises an axial aperture 44 bounded by two parallel walls 45 one on each side of an imaginary radially extending center plane P containing the turbojet-engine's axis X is shown in FIG. 5.

In a first embodiment of the invention shown in FIG. 3, the distance between the two parallel walls 45 is substantially equal to the diameter of the roller 41, and the roller 41 is configured in the aperture 44. The spherical portion of the roller 41 allows the center of the roller 41 to translate in the center plane of the aperture 44 and furthermore enables the rotations of the vectoring ring 20 which are required by its kinematics about the center of the roller 41.

In a second embodiment of the invention, shown in FIG. 4, the distance separating the two parallel walls 45 defining the aperture 44 is larger than the diameter of the spherical roller 41. A first slide 46 is mounted on the base 43 so as to slide freely along the walls 45 inside the aperture 43 in the direction of longitudinal axis X.

The first slide 46 includes an orifice 47 having a noncircular cross-section with an axis perpendicular to the longitudinal axis X. A second slide 48 is mounted in the orifice 47. The spherical roller 41 is rotatably mounted to the second slide 48 to permit rotatable movement with respect to axis X. Upon rotational movement of the spherical roller 41, the second slide 48 and the spherical roller 41 cooperate to urge movement of the first slide 46 along axis X.

Identically displacing the rods 33 of three linear control actuators 30 causes the vectoring ring 20 to translate parallel to the axis X, the three rollers 41 being kept in the apertures 44 of the bases 43, their centers A, B and C being situated in intersecting planes along the axis X and subtending between them angles of 120°. The distances between the centers A, B and C of the rollers 41 always remain constant.

A differential displacement of the rods 33 of the three linear control actuators 30 causes the vectoring ring 20 to move relative to the axis X. However because the rollers 41 are kept in place inside the apertures 44, there shall be a unique position of the vectoring ring 20 relative to the casing 2. The motion of the vectoring ring 20 causes a displacement of the diverging flaps 7 and a change in the exhaust cross-section A9 of the diverging portion of the nozzle 1, entailing a deviation of the jet of exhaust gases and differential pressures on the inside surfaces of the diverging flaps 7. The component of these pressures is tangentially absorbed by the walls 45 bounding the apertures 44.

The foregoing descriptions are provided for illustrative purposes only and should not be construed as in any way as limiting this invention, the scope of which is defined solely by the appended claims.

What is claimed is:

1. A swiveling, axisymmetric, converging-diverging exhaust nozzle for a turbojet engine having a central axis X, of which a diverging portion situated downstream of a converging portion is able to swivel relative to axis X, said diverging portion comprising a plurality of diverging flaps (7) hinging upstream on the downstream ends of the converging flaps (3) and hinging downstream on linkrods (21) connected to a vectoring ring (20) of which the axial displacement and tipping movement are driven by a plurality of linear actuators (30) anchored in a stationary structure (2), guides (42) guiding the vectoring ring (20) relative to the stationary structure (2) while it is moving, wherein the guides (42) of the vectoring ring (20) comprise three axial apertures (44) having radial sidewalls and which are each disposed in a base (43) rigidly joined to relatively stationary structure (2) and of which imaginary center planes intersect the axis X, said side walls (45) of said apertures guiding three spherical rollers (41) fastened to mutually equidistant radial stubs (40) rigidly affixed to the vectoring ring (30), wherein each spherical roller (41) is mounted in a corresponding aperture (44) and cooperates with a first slide (46) arranged to slide axially along the side walls (45) of said corresponding aperture (44) in the direction of axis X and a second slide (48) mounted on the first slide (46), said spherical roller (41) being rotatably mounted to said second slide (48).

2. The nozzle as claimed in claim 1, wherein there is provided three of said linear actuators (30) and three of said guides (42).

3. The nozzle as claimed in claim 1 wherein the linear actuators (30) are connected by swivels (34, 35) to the vectoring ring (20) and to the stationary structure (2).

4. The nozzle as claimed in claim 1 wherein the radial stubs (40) extend inwardly of the vectoring ring (20).

5. The nozzle as claimed in claim 1, wherein the first slide (46) forms an orifice having an axis generally perpendicular to axis X in which the second slide (48) is mounted therein.

* * * * *